(12) United States Patent
Wong et al.

(10) Patent No.: US 9,977,184 B1
(45) Date of Patent: May 22, 2018

(54) SPATIO-TEMPORALLY INCREMENTAL FIBER SWEPT SOURCE

(71) Applicant: The University of Hong Kong, Hong Kong (CN)

(72) Inventors: Kenneth Kin Yip Wong, Kowloon (HK); Xiaoming Wei, Whitty Street (HK)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 0 days. days.

(21) Appl. No.: 15/347,602

(22) Filed: Nov. 9, 2016

(51) Int. Cl.
*G02B 6/04* (2006.01)
*G02B 6/42* (2006.01)
*G02B 6/293* (2006.01)
*H01S 3/11* (2006.01)
*H01S 3/067* (2006.01)
*H01S 3/0941* (2006.01)
*H01S 3/094* (2006.01)
*G02B 6/32* (2006.01)
*H04N 7/18* (2006.01)

(52) U.S. Cl.
CPC ............ *G02B 6/04* (2013.01); *G02B 6/2938* (2013.01); *G02B 6/32* (2013.01); *G02B 6/4285* (2013.01); *H01S 3/06791* (2013.01); *H01S 3/0941* (2013.01); *H01S 3/094053* (2013.01); *H01S 3/1106* (2013.01); *H04N 7/18* (2013.01)

(58) Field of Classification Search
CPC .......... G02B 6/04; G02B 6/2938; G02B 6/32; G02B 6/4285; H01S 3/06791; H01S 3/094053; H01S 3/0941; H01S 3/1106; H04N 7/18
See application file for complete search history.

(56) References Cited

U.S. PATENT DOCUMENTS

| 3,892,468 A | * | 7/1975 | Duguay | ............... | G02B 6/2861 250/227.11 |
| 4,952,022 A | * | 8/1990 | Genovese | ............ | G02B 6/0008 156/169 |
| 6,587,189 B1 | | 7/2003 | Roberts et al. | | |
| 2004/0155192 A1 | | 8/2004 | Tran et al. | | |

OTHER PUBLICATIONS www.newport.comcom/f/precision-motorized-actuators-lta-series?q=actuator:relevance, dated Aug. 23, 2017 (4 pages) Newport, LTA Precision Motorized Actuators.
(Continued)

*Primary Examiner* — Armando Rodriguez
(74) *Attorney, Agent, or Firm* — Leason Ellis LLP

(57) ABSTRACT

A spatio-temporally incremental fiber sweep source includes a laser light pulse generator for generating light pulses and a fiber array of individual optical fibers. The fiber array has an input end and an output end, with the fibers at the input end receiving the light pulses substantially simultaneously. The optical fibers at the output end are arranged in a raster scan pattern, e.g., a square pattern, wherein the optical delay in each fiber is greater than the previous one in the scan pattern direction. As a result light exits the array in a completely optical two dimensional raster scan pattern. It has no moving parts, and thus no mechanical inertia, so extremely high speed scanning can be achieved.

9 Claims, 4 Drawing Sheets

(56) References Cited

OTHER PUBLICATIONS

X. Chen, U. Leischner, Z. Varga, H. Jia, D. Deca, N. L. Rochefort, and A. Konnerth. "LOTOS-based two-photon calcium imaging of dendritic spines in vivo," Nature Protocols, vol. 7, No. 10, 1818-1829 (2012).

http://www.shimadzu.com/an/test/hpv/hpv2 1 .html—Specifications—High-Speed Video Camera-HeyperVision HPV-2 High-Speed Video Camera: Shimadzu Scientific Instruments, dated Aug. 23, 2017 (3 pages).

R. Huber, M. Wojtkowski and J. G. Fujimoto, "Fourier Domain Mode Locking (FDML): A new laser operating regime and applications for optical coherence tomography," Optics Express, Apr. 17, 2006, vol. 14, 3225-3237.

K. Goda. K. K. Tsia. and B. Jalali, "Serial time-encoded amplified imaging for real-time observation of fast dynamic phenomena," Nature, Apr. 30, 2009, vol. 458, 1145-1149.

N. G. Horton. K. Wang. D. Kobal C. G. Clark. F. W. Wise. C. B. Schaffer. and C. Xu. "In vivo three-photon microscopy of subcortical structures within an intact mouse brain." Nature Photonics, Mar. 2013, vol. 7, 205-209.

R. Cook and Y. Z. Shen, "Optical fiber-based single-shot picosecond transient absorption spectroscopy," Review of Scientific Instruments, 80, 073106-1-073106-7 (2009).

https://www.thorlabs.com/newgrouppage9.cfm?objectgroup_id=336) Ytterbium-Doped Optical Fiber, Thorlabs dated Aug. 23, 2017 (3 pages).

\* cited by examiner

FIG. 1A
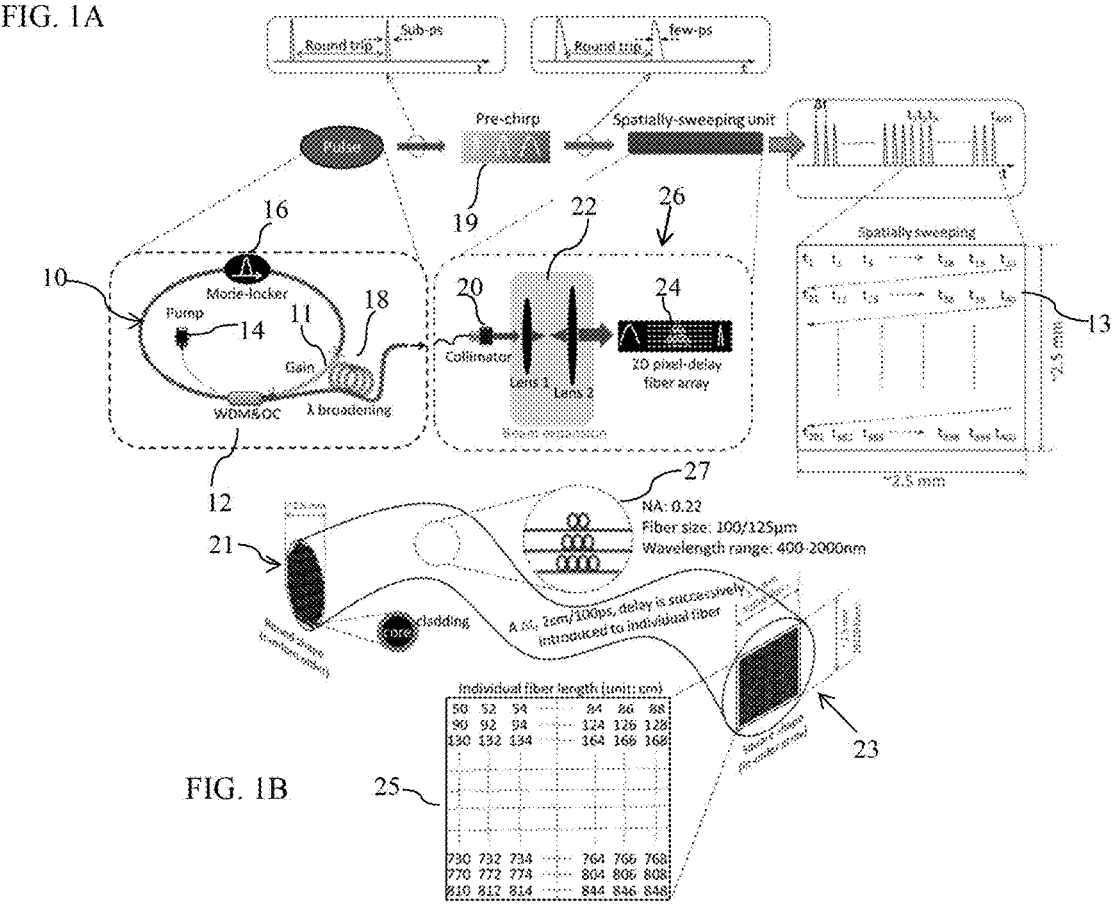
FIG. 1B
FIG. 2
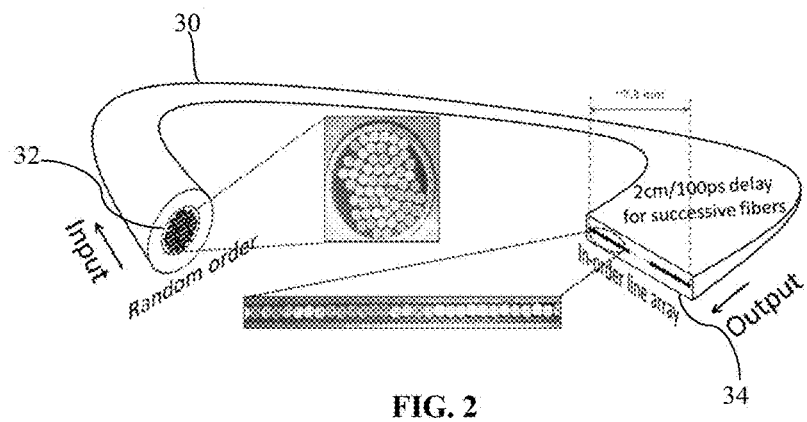

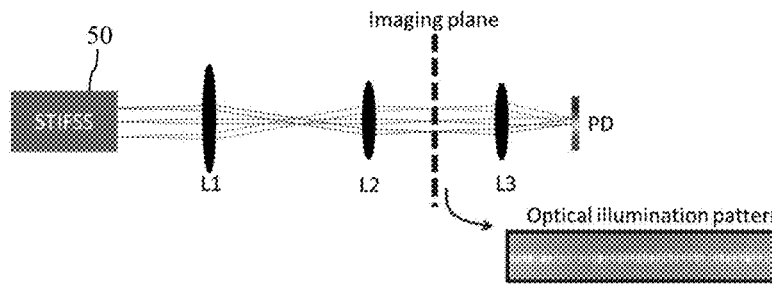
FIG. 5A
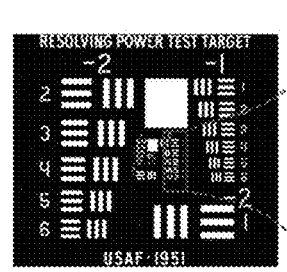
FIG. 5C
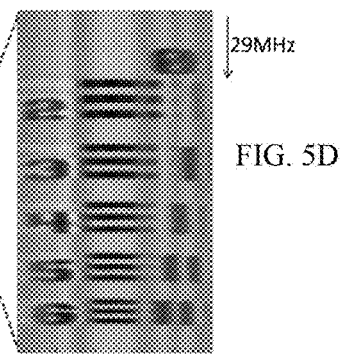
FIG. 5D
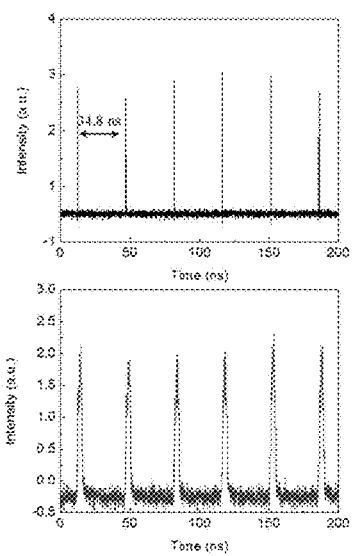
FIG. 6A
FIG. 6C
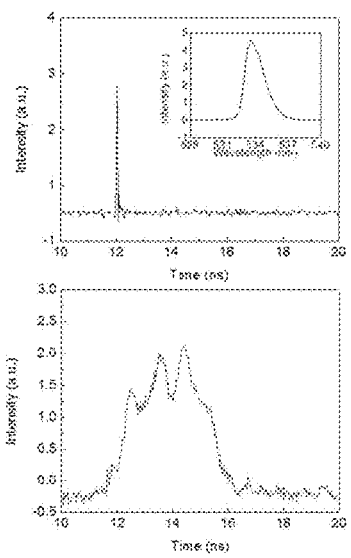
FIG. 6B
FIG. 6D

SPATIO-TEMPORALLY INCREMENTAL FIBER SWEPT SOURCE

FIELD OF THE INVENTION

The present invention relates to an optical fiber source for providing ultrafast inertia-free spatially-scanning laser pulses.

BACKGROUND OF THE INVENTION

Optical imaging has drawn great attention from various areas in the past decade, particularly industrial inspection and biomedical diagnosis. As the scientific research has gone deeper and deeper into the details of these areas, people have become more and more interested in dynamic behaviors, especially those involved in life science, e.g. hemokinesis, cytology and neurology, which provide information that may help provide a better understanding of the human body. In particular there is great interest in ultrafast dynamic diagnosis of disease and other tissue functionality. To visualize high-speed dynamic events, an optical imager is required to provide high sensitivity and high throughput. Modern photo-receivers can offer excellent sensitivity, e.g. widely-used CCD/CMOS cameras and photomultiplier tubes (PMT). Their imaging speed, on the other hand, is largely limited, which results in blurred images. Thus enhancing the speed of optical systems has become a hot topic in recent years. Typically, there are two main issues that have to be addressed for increasing the effective speed of an optical system: scanning speed and signal readout speed.

The conventional way to perform two-dimensional (2D) imaging is point-by-point scanning (i.e., raster-scanning) over the object through multi-dimensional translation stages. Mechanical inertia, unfortunately, limits the moving speed of these bulky stages, typically to several mm/s. For an example of such mechanical stages or actuators, see the LTA Precision Motorized Actuators, Series 300862, made by Newport Corporation. https://www.newport.com/Precision-Motorized-Actuators,-LTA-Series/300862/1003/info.aspx#tab_Specifications. It thus takes 10s of minutes or even hours to finish a 2D image scan.

The object or sample can be moved by mechanical stages through a beam or, rather than moving the sample, the more favored way is to scan the laser beam over the object by using high-speed scanning galvanometer mirrors (~kHz) or acousto-optic deflectors (AOD, 10s of kHz), which can boost the 2D imaging frame rate to 100 Hz. See X. Chen, U. Leischner, Z. Varga, H. Jia, D. Deca, N. L. Rochefort, and A. Konnerth, "LOTOS-based two-photon calcium imaging of dendritic spines in vivo," Nat. Protoc. 7(10), 1818-1829 (2012), which is incorporated herein by reference in its entirety. Although in the latter case, i.e., where the beam is moved, can indeed perform the video rate imaging, it is still far from the requirements for a 3D volumetric visualization of those highly dynamic objects.

In addition to the scanning speed, the readout time of the optical signal is another limitation on effectively boosting up the imaging speed, and it must be fast enough to acquire the fast scanning signal. Traditionally, the optical signal is read out through CCD/CMOS cameras, which however exhibit an unacceptable latency and result in a slow frame rate, typically 100 Hz, and hence a long read-out time. See, the Hyper Vision HPV-2 high speed video camera of Shimadzu Corporation of Kyoto Japan, http://www.shimadzu.com/an/test/hpv/hpv2_1.html, which is incorporated herein by reference in its entirety. To overcome those issues, the wavelength-swept source, e.g. Fourier-domain mode-locking (FDML) swept source, has recently been proposed to leverage those high-speed photodetectors (PDs) for fast imaging, and to enable the video-rate necessary for 2D imaging. See R. Huber, M. Wojtkowski, and J. G Fujimoto, "Fourier Domain Mode Locking (FDML): A new laser operating regime and applications for optical coherence tomography," Opt. Express 14, 3225-3237 (2006), which is incorporated herein by reference in its entirety. Unfortunately, the wavelength-swept source is a point source, and it is still necessary to perform point scanning via, e.g., galvanometer scanning, for 2D/3D imaging.

Optical time-stretch is an emerging powerful all-optical technique that can further enhance the wavelength-swept rate up to the MHz range. See, K. Goda, K. K. Tsia, and B. Jalali, "Serial time-encoded amplified imaging for real-time observation of fast dynamic phenomena," Nature 458, 1145-1149 (2009), which is incorporated herein by reference in its entirety. However, it has the same issue as that of FDML, i.e., extra scanning is required. In particular, mechanical or electronic scanning units are needed to perform 2D imaging. More importantly, wavelength-swept sources such as those used in traditional flow cytometers, operate at a kHz level and exhibit a broad pulse waveform with limited instantaneous peak power, typically at the mW level. The nature of the time-stretch, i.e., high frequency chirping, also limits the instantaneous peak power. Thus it cannot be used for those applications requiring high peak power, for example multiphoton imaging. See, N. G Horton, K. Wang, D. Kobat, C. G Clark, F. W. Wise, C. B. Schaffer, and C. Xu, "In vivo three-photon microscopy of subcortical structures within an intact mouse brain," Nature Photon., 7, 205-209 (2013), which is incorporated herein by reference in its entirety.

SUMMARY OF THE INVENTION

The present invention provides a 2D spatially-sweeping source, as a new laser source, to overcome all of the limitations mentioned above, and to boost the frame rate of 2D imaging to an unprecedented level—10s of MHz, i.e. 2D image capture within <100 ns. The invention is implemented with a spatio-temporally incremental fiber swept source (STIFSS). With STIFSS a laser beam is applied to one end of a bunch of optical fibers. At the other end of the bunch the fibers are arranged in a raster display. The fibers of the display have different lengths in sequence such that the light beam appears as a raster scan in the display without the need for mechanical or electronic movement of a beam or object. Such fast image capture is crucial for those applications where traditional raster scanning is impossible, particularly for the high-throughput flow cytometers.

Different from the traditional swept source with a low instantaneous power (mW), the 2D spatially-sweeping STIFSS can provide a peak power up to the kW level, which would allow use in applications such as two-photon or even three-photon confocal microscopy. The dwell time of a single spatial pixel, in addition, is in the order of sub picoseconds (sub-ps)—several orders of magnitude faster than that of CCD/CMOS cameras. Its ultra wide operational wavelength range (more than an octave-spanning), in addition, enables massive applications, e.g. ultrafast multi-photon imaging, spectrally-encoded imaging, hyper-spectral imaging. More importantly, it is a cost-effective solution for optical imaging systems.

The main elements of STIFSS are (1) ultrafast femtosecond (fs) pulse generation, (2) pulse pre-chirping; and (3)

ultrafast spatial sweeping. For the fs pulse generation, a simple fiber ring cavity is employed to perform nonlinear polarization rotation (NPR) mode-locking. This yields an fs pulse train. To simplify the cavity, a compact optical integrated module (OIM) is designed to provide multiple optical functions: pump combining, polarization-sensitive unidirectional operation and signal tapping. The gain medium is a piece of rare-earth-doped fiber, which is pumped by a fiber-pigtail laser diode. The operating condition of this fs laser cavity is optimized by an in-line polarization controller. The cavity length L determines the 2D frame.

The pre-chirp unit is essentially a piece of single-mode fiber (SMF), ~100 m in length. It is primarily utilized to compensate for the chirping later induced by the spatially sweeping unit (SSU). The system is designed so that dispersion in the pre-chirp is opposite to that in the SSUs, respectively.

For the spatial sweeping, the pre-chirp pulse is launched into a free-space telescope through a fiber collimator. The telescope expands the beam size output from the collimator, typically several mm, to match the aperture of the subsequent fiber bundle or array. After the telescope, the expanded laser beam is coupled into the 2D pixel-delay fiber bundle or array to achieve the spatial sweeping based on the differential delay in the fibers.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1A is a schematic diagram of the spatio-temporally incremental fiber swept source (STIFSS) according to the present invention and FIG. 1B is a schematic diagram of a 2D pixel-delay fiber array according to the present invention;

FIG. 2 is a schematic diagram of a 1D pixel-delay fiber array illustrating the principles of the present invention, where inset shows white-light microscopic images of the input and output ends of a one dimensional output fiber array;

FIG. 5A is a diagram of the imaging setup for a one dimensional STIFSS at a line-scan rate of 29 MHz. FIG. 5B shows the optical illumination pattern at the imaging plane in FIG. 5A, FIG. 5C is a USAF 1951 resolution target used as a sample target in the setup of FIG. 5A and FIG. 5D is the image of the target of FIG. 5C captured with STIFSS of FIG. 5A;

FIG. 6A is an intensity graph of the temporal pulse train of STIFSS at 530 nm by frequency doubling a Yb-gain fiber laser before the SSU, FIG. 6B is an enlarged version of FIG. 6A with an inset showing an optical spectrum of a mode-locked pulse after frequency doubling, FIG. 6C is an intensity graph of the temporal pulse train of STIFSS at 530 nm by frequency doubling a Yb-gain fiber laser after the SSU and FIG. 6D is an enlarged version of FIG. 6C;

FIG. 8D is an enlarged version of FIG. 8C.

DETAILED DESCRIPTION

Figure 3A:
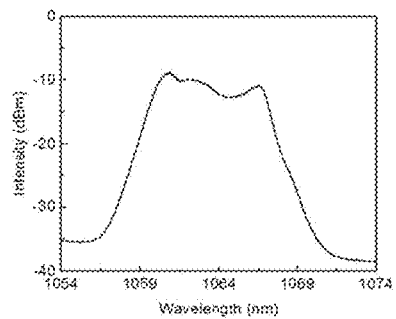
FIG. 3A is a graph of the optical spectra of a Yb-gain fiber STIFSS before spectral broadening and FIG. 3B is a graph of the same spectra after spectral broadening.

The spatio-temporally incremental fiber swept source (STIFSS) of the present invention provides an ultrafast inertia-free spatially-scanning laser pulse for each frame of imaging. The sub-ps pulse train is linearly mapped into a 2D spatial distribution by a differential time delay in the fibers of a fiber array as shown in FIG. 1B. Each spatial pixel offers a sub-ps dwell time. This completely-new laser source can be directly applied to existing optical imaging systems and it can perform 2D imaging at a frame rate of 10s MHz, which is several orders of magnitude faster than that of mechanical raster scanning systems, which typically operate in the range of kHz.

As shown in FIG. 1A the STIFSS can be divided into three parts: 1) high power ultra-short pulse generation (ultrafast femtosecond (fs) pulse generation) with wavelength window management, 2) pulse pre-chirp and 3) ultrafast spatial sweeping. For the high power ultrashort pulse generation, a simple fiber ring cavity 10 is employed to perform nonlinear polarization rotation (NPR) mode-locking, providing a sub-ps or fs pulse train at 10s of MHz. To simplify the cavity, a fiber-based optical integrated module (OIM) 12 is used to provide multiple optical functions: wavelength-division multiplexing (WDM) for pump and signal combining, and optical coupling (OC) for signal extraction. In particular, OIM 12 provides pump combining, polarization-sensitive unidirectional operation and signal tapping. The gain medium is a piece of rare-earth-doped fiber 11, which is pumped by a fiber-pigtail laser diode 14. To enable a high average output power, the gain fiber 11 has a double-cladding design, including inner and outer cladding, which has been commercially available. The inner cladding mainly confines the signal in a small core (~10 μm) for single-mode operation, while the outer cladding facilitates the propagation of the multimode pump laser with a larger mode size (~100 μm). In this way the laser cavity can be pumped by using cost-effective high power multimode pump laser diodes, typically offering 10s of watts in power. Benefiting from the high efficiency of state-of-the-art double-cladding gain fibers, e.g. >70% at 1.0 μm (see https://www.thorlabs.com/newsgrouppage9.cfm?objectgroup_id=336); the average optical power of the output signal can reach several watts. To ensure the laser cavity to deliver ultrashort pulses, a mode-locker 16 is employed inside the fiber cavity. The mode-locker can be active (e.g. intensity modulator), or passive (e.g. semiconductor saturable absorber and nonlinear polarization rotator). The cavity length L will determine the 2D frame rate. Basically, the pulse laser can be bidirectional or unidirectional, while the latter case requires an additional isolator.

In order to satisfy different wavelengths of interest for specific applications, the operational wavelength of the laser cavity has to be switchable or broad enough for selection by different users. To meet this need, a STIFSS system can be designed with two wavelength engineering schemes: First, the center wavelength of the mode-locked pulse from the fiber cavity is designed to be simply changed by choosing different doping fibers, e.g. Nd-doped for 900 nm, Yb-doped for 1.0 μm, Er-doped for 1.5 μm and Tm-doped for 2.0 μm. Second, the wavelength range outside the fiber cavity can be further broadened by using a highly-nonlinear fiber 18, e.g. photonic crystal fiber (PCF). With these two schemes, the wavelength window is very flexible for different applications.

To manage the pulse broadening effect due to the dispersion issue in the optical fiber, and obtain an ultra-short pulse approaching being transform-limited at the final output of STIFSS, a pre-chirp unit 19 is utilized right after the spectral broadening to chirp ahead the pulse with opposite dispersion, which can compensate for the dispersion to be experienced during the later propagation, mainly in the spatially sweeping unit (SSU) that follows it. This pre-chirp can be achieved through dispersive elements, e.g. single-mode fibers (SMFs) or chirped fiber Bragg gratings (FBGs). It can be a piece of SMF, ~100 μm in length. It should be noted that the goal is to make the dispersion in the pre-chirp equal to and opposite from that introduced by the SSUs, respectively.

For the spatially sweeping carried out by SSU 26, the pre-chirp pulse is applied to a free-space telescope 22 through a fiber collimator 20. The telescope, composed of two optical lenses, expands the beam size of the fiber collimator, typically 1-2 mm, to match the input aperture of the fiber array 24 (see FIG. 1B). After the telescope, the expanded laser beam is coupled into the 2D pixel-delay fiber array for spatially sweeping. As shown in FIG. 1B, the fiber array is an specially-designed fiber bundle of, for example 400 fibers, and each has a 100 μm core and 125 μm cladding. The input end 21 of the pixel-delay fiber bundle is packaged in a round shape with a random order for the fibers order; while the other end 23 is in a square shape (20×20 fibers in a ~2.5×2.5 mm size). Having the fibers at the input in a random pattern reduces the possibility of light variation in the output due to non-uniform input light. Also, the arrangement of the fibers at the output end can be any convenient scan shape, e.g., rectangular for a wide screen display. The output fibers are arranged in an order such that successive fibers are implemented with an incremental length of ~2 cm, corresponding to a time delay of ~100 ps. Thus the pulses exiting from the output end of fiber bundle are sequenced in a raster fashion as shown in the table inset 25 of FIG. 1B. Thus, the simultaneously input pulses will exit the fiber bundle one by one with a time delay of 100 ps, as shown in the right inset 13 of FIG. 1A, i.e. performing spatial scanning in an all-optical manner. The optical fiber of the bundle may have a numerical aperture (NA) of 0.22, and covers a wavelength range from 400 nm to 2000 nm, see inset 27 of FIG. 1B. Since each pulse from the fiber laser cavity will generate a 2D spatially-sweeping pattern, the 2D scan rate is consistent with the repetition rate of the fiber laser, as shown in right side of FIG. 1A, i.e., the repetition rate determined by the cavity length L.

Figure 3B:
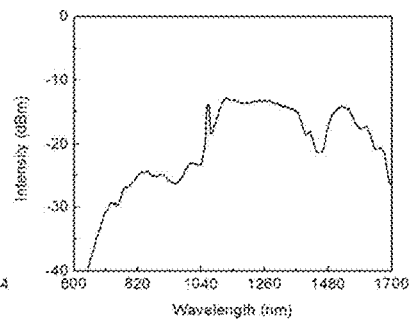
Figure 4A:
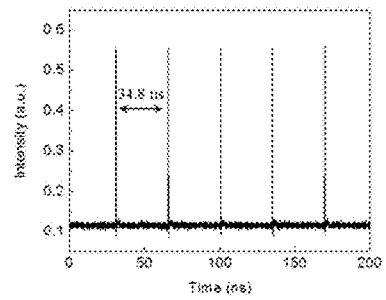
FIG. 4A is an intensity graph of the temporal pulse train of the one dimensional STIFSS with a Yb-gain fiber at 1.0 μm before the SSU.
Figure 4B:
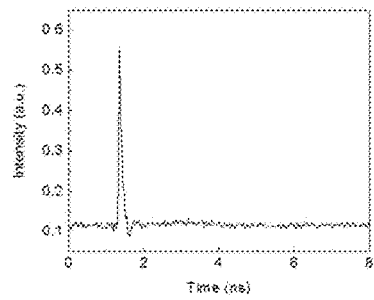
FIG. 4B is an enlarged version of FIG. 4A.
Figure 4C:
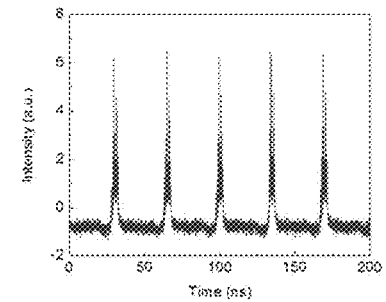
FIG. 4C is an intensity graph of the temporal pulse train of the one dimensional STIFSS with a Yb-gain fiber after the SSU and FIG. 4D is an enlarged version of FIG. 4C.
Figure 4D:
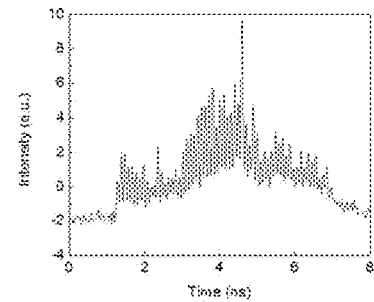
Figure 7A:
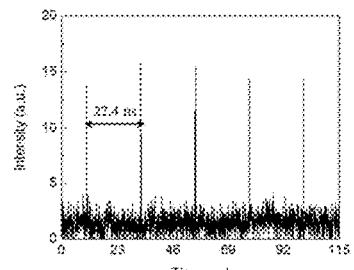
FIG. 7A is an intensity graph of the temporal pulse train of STIFSS with an Er-gain fiber before the SSU.
Figure 7B:
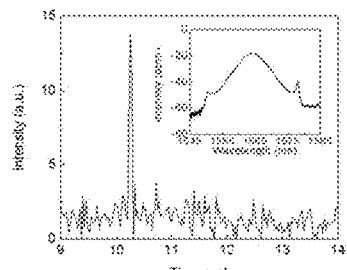
FIG. 7B is an enlarged version of FIG. 7A with an inset showing the optical spectrum of a mode-locked pulse from the laser cavity.
Figure 7C:
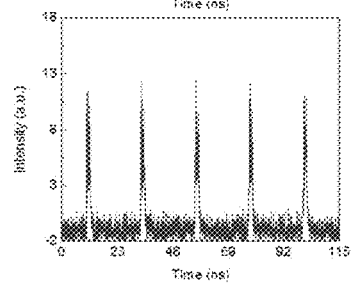
FIG. 7C is an intensity graph of the temporal pulse train of STIFSS with an Er-gain fiber after the SSU and FIG. 7D is an enlarged version of FIG. 7C.
Figure 7D:
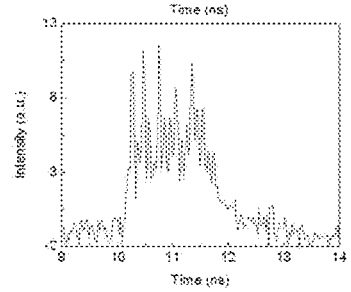

In order to prove the concept, a preliminary study was conducted with a one dimensional (1D) version of STIFSS having an optical wavelength ranging from 530 nm to 1900 nm. This design was applied to perform ultrafast imaging. As shown in FIG. 2, 58-fibers were constructed into a fiber bundle or array 30 in which, at the input end 32, the 58 fibers were randomly bound together in a circle, while at the output end 34 they were configured into a 1×58 array with a length increment of 2 cm. The fibers have a size of 190/200 μm for core/cladding, respectively. For a first test the laser cavity was constructed with Yb-doped gain fiber. The optical spectrum of the mode-locked pulse directly output from the fiber cavity is illustrated in FIG. 3A, which is centered at 1064 nm with a bandwidth of ~10 nm. The optical spectrum after passing through a highly-nonlinear fiber was greatly broadened to cover a range from ~700 nm to ~1700 nm as shown in FIG. 3B. The temporal waveforms before and after the SSU 26 are illustrated in FIG. 4A (enlarged in FIG. 4B) and FIG. 4C (enlarged in FIG. 4D), respectively. As shown in the FIGS. 4B and 4D, a single narrow pulse, measured at the input of SSU 26, has been spatially distributed onto a broad pulse waveform (around 5.8 ns, corresponding to 100×58 ps). The sub-pulse from an individual fiber pixel is also clearly shown, i.e. spatially sweeping along the 1D fiber array facet. The temporal separation between adjacent pixels is ~100 ps, corresponding to the fiber length increment of 2 cm. The line-scan rate was determined by the repetition rate of the laser source, as shown in FIG. 4A and FIG. 4C, i.e. 29 MHz in this case. It is noted that the line-scan rate is scalable by changing the repetition rate of the laser seed source, e.g. changing the cavity length. The performance shown in FIG. 4 is at 1.0 μm.

Then, the STIFSS with the Yb-gain fiber was applied to perform ultrafast microscopy, as shown in FIG. 5A. The spatially-sweeping waveform train from STIFSS 50 was launched into the optical imaging part (FIG. 5A) through two relay optical lenses (L1 and L2) forming a beam expander. At the imaging plane there was a linear illumination shower (single line raster light scan) as shown in FIG. 5B, whose pixels are temporally stepping at an interval of ~100 ps. These pixels are encoded with the spatial information of the sample. The sample used for this study was a USAF 1951 resolution target, as shown in FIG. 5C. After the sample, another optical lens (L3) was utilized to focus the STIFSS pulse train onto a high-speed photodetector PD for optical detection. The PD may be a single-pixel photodiode, which currently has a bandwidth of 10s of GHz. The image captured with this ultrafast STIFSS is depicted in FIG. 5D. In this test the illumination shower was in the horizontal direction, while mechanical scanning was performed from top to bottom. The optical line-scan rate was 29 MHz in this case.

In addition to the STIFSS with Yb-gain fiber, tests were also performed at other center wavelengths without spectral broadening, which may be useful for applications in other fields. In particular, the pulse output from the Yb-gain fiber cavity was frequency-doubled to 530 nm, which was realized by inserting a KTP nonlinear crystal right before the SSU. The performance of the 530-nm STIFSS is shown in FIG. 6. In particular, FIG. 6A shows the temporal pulse train of STIFSS with Yb-gain fiber and frequency doubling to 530 nm before the SSU. FIG. 6B is an enlarged version of FIG. 6A with an inset showing the optical spectrum of a mode-locked pulse after frequency doubling. FIG. 6C shows the temporal pulse train of STIFSS with a Yb-gain fiber and frequency doubling at 530 nm after the SSU. FIG. 6D is an enlarged version of FIG. 6C. The spatial sweeping operation is clearly shown in FIGS. 6B and 6D. It should be pointed out that, the sub-pixel pulse vanishes from the illustration due to the limited bandwidth of the 2-GHz silicon visible window PD being used.

FIGS. 7 and 8 show the performance of STIFSS at with Er- and Tm-gain fiber, respectively. In particular, FIG. 7A shows the temporal pulse train of STIFSS with an Er-gain fiber before the SSU and FIG. 7B is an enlarged version of FIG. 7A with an inset showing the optical spectrum of a mode-locked pulse from the laser cavity. FIG. 7C illustrates the temporal pulse train of STIFSS with an Er-gain fiber after the SSU and FIG. 7D is an enlarged version of FIG. 7C. The performance shown in FIG. 7 is at 1.5 µm.

Figure 8A:
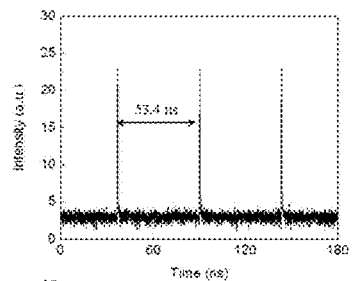
FIG. 8A is an intensity graph of the temporal pulse train of STIFSS with a Tm-gain fiber before the SSU.
Figure 8B:
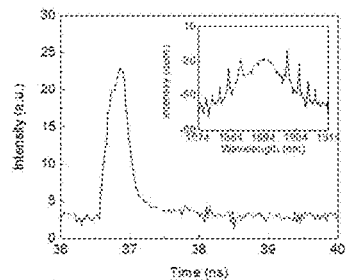
FIG. 8B is an enlarged version of FIG. 8A with an insert showing the optical spectrum of a mode-locked pulse directly output from the laser cavity.
Figure 8C:
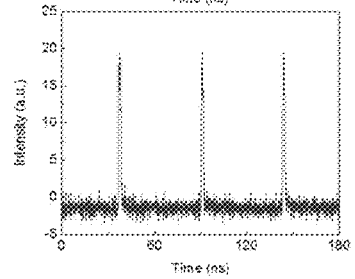
FIG. 8C is an intensity graph of the temporal pulse train of STIFSS with a Tm-gain fiber after the SSU.

FIG. 8A illustrates the temporal pulse train of STIFSS with a Tm-gain fiber before the SSU and FIG. 8B is an enlarged version of FIG. 8A with an insert showing the optical spectrum of a mode-locked pulse directly output from the laser cavity. FIG. 8C shows the temporal pulse train of STIFSS with a Tm-gain fiber after the SSU and FIG. 8D is an enlarged version of FIG. 8C. The performance shown in FIG. 8 is at 2.0 µm.

For the tests illustrated in FIGS. 7 and 8, the fiber cavities of the seed sources were constructed with Er- and Tm-doped gain fibers, respectively. It should be pointed out that the temporal pulse packet of these two cases is not as broad as that of the 1.0-µm version (FIG. 4). This is because the beam size at the input of the SSU was not optimized due to the lack of a telescope at 1.5 and 2.0 µm during the test. In addition, the disappearance of the sub-pulse in the case of 2.0 µm STIFSS is due to a broader pulse width (>300 ps) of the original seed pulse from the fiber cavity, as shown in FIG. 8B. Thus, the results can be improved upon. It should be remembered that a broad wavelength range (530-2000 nm) has been achieved with a single SSU.

The present invention thus provides an ultrafast single-shot imaging systems to enhance the 2D imaging speed. Taking multiphoton microscopy as an example, the sub-ps dwell time together with inertia-free 2D scanning enables the unprecedented ultrafast fluorescence imaging. Another application is real time 2D imaging of flow cytometry. Different from conventional cytometry, which can only provide a blurred dot, the 2D spatially-swept source of the present invention can enable 10s m/s flowing 2D images. Furthermore, it can provide not only a morphological image via 2D spatial-encoding, but also chemical information as a result of its high peak power.

While the present invention has been particularly shown and described with reference to preferred embodiments thereof; it will be understood by those skilled in the art that various changes in form and details may be made therein without departing from the spirit and scope of the invention.

The invention claimed is:

1. A spatio-temporally incremental fiber sweep source comprising:
   a light pulse generator for generating light pulses;
   a collimator and a beam expander, wherein the collimator receive the light pulses from the light pulse generator and passes them to the beam expander, and
   a fiber array of individual optical fibers having an input end and an output end, fibers at the input end receiving the light pulses from the beam expander substantially simultaneously, the optical fibers at the output end being arranged in a raster scan pattern wherein the optical delay in each fiber is greater than the previous one in the scan pattern direction whereby light exits the array in the raster scan pattern as a sweep source.

2. The sweep source of claim 1 wherein the light pulse generator comprises:
   a fiber ring cavity that performs polarization rotation mode-locking;
   a laser diode that pumps light pulses into the fiber ring cavity;
   a mode-locker inside the fiber cavity to insure the delivery of ultra-short pulses;
   a fiber-based optical integrated module that provides wavelength-division multiplexing for pump and signal combining, and optical coupling for signal extraction said integrated module providing an output pulse from said fiber ring cavity; and
   a pre-chirp unit that received the output from the integrated module and chirping ahead the pulse to compensate for dispersion to be experienced during passage of the light through the fiber array.

3. The sweep source of claim 2 wherein the fiber of the fiber ring cavity is rare-earth-doped fiber with double cladding.

4. The sweep source of claim 2 wherein the laser diode is a high power multimode fiber-pigtail pump laser diode.

5. The sweep source of claim 2 wherein the mode-locker is either active (e.g. intensity modulator), or passive (e.g. semiconductor saturable absorber and nonlinear polarization rotator).

6. The sweep source of claim 2 wherein the wavelength range of the light pulse generator is changed by placing a nonlinear fiber optic device before the fiber array.

7. The sweep source of claim 1 wherein the optical delay in the fibers is controlled by controlling the fiber lengths.

8. The sweep source of claim 1 wherein the optical fibers of the fiber array at the input are arranged randomly in a circular pattern and at the output end they are arranged in a rectangular raster scan pattern.

9. An image generator comprising:
   a sweep source according to claim 1
   a first lens system for forming collimated light from light received from the sweep source and directing the collimated light onto a specimen at an imaging plane;
   a second lens system after the imaging plane for collecting light encoded by the specimen at the imaging plane; and
   a photodetector for receiving the encoded light and forming an image therefrom.

* * * * *